United States Patent
Yang et al.

(10) Patent No.: US 9,143,012 B2
(45) Date of Patent: Sep. 22, 2015

(54) ELECTRICAL ROTOR AND STATOR STRUCTURE

(71) Applicant: INDUSTRIAL TECHNOLOGY RESEARCH INSTITUTE, Hsinchu (TW)

(72) Inventors: Han-Ping Yang, Hsinchu (TW); Cheng-Hsuan Lin, Taoyuan County (TW); Chau-Shin Jang, Hsinchu County (TW); Wen-Yang Peng, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 222 days.

(21) Appl. No.: 13/759,836

(22) Filed: Feb. 5, 2013

(65) Prior Publication Data
US 2014/0103773 A1    Apr. 17, 2014

(30) Foreign Application Priority Data

Oct. 17, 2012    (TW) .............................. 101138330 A (51) Int. Cl.
*H02K 1/08*    (2006.01)
*H02K 21/24*    (2006.01)
*H02K 1/27*    (2006.01)

(52) U.S. Cl.
CPC .............. *H02K 1/08* (2013.01); *H02K 1/2793* (2013.01); *H02K 21/24* (2013.01); *H02K 2201/06* (2013.01); *H02K 2213/03* (2013.01)

(58) Field of Classification Search
CPC .................................................... H02K 1/2793
USPC ..................... 310/266, 268, 112, 114, 156.38, 310/156.48, 156.58, 156.59, 156.61, 310/156.62, 156.64, 49.42, 154.05, 154.37, 310/156.32, 156.63, 156.82
See application file for complete search history.

(56) References Cited

U.S. PATENT DOCUMENTS 5,072,144 A * 12/1991 Saito et al. ................. 310/12.28
5,097,166 A    3/1992 Mikulic
(Continued)

FOREIGN PATENT DOCUMENTS

CN    100588088 C    2/2010
CN    102044946 A    5/2011
(Continued)

OTHER PUBLICATIONS

Wu et al., A Cogging Torque Reduction Method for Surface Mounted Permanent Magnet Motor, Proceeding of International Conference on Electrical Machines and Systems, Oct. 8-11, 2007, Seoul Korea, pp. 769-773.
(Continued)

*Primary Examiner* — Naishadh Desai
(74) *Attorney, Agent, or Firm* — Locke Lord LLP; Tim Tingkang Xia, Esq.

(57) ABSTRACT

An electrical rotor and stator structure includes at least one stator, at least one rotor and multiple outward pillar structures. The at least one stator includes multiple first magnetic members. Each first magnetic member has a first surface. The at least one rotor is able to be rotated pivotally relative to the at least one stator. The at least one rotor includes multiple second magnetic members. Each second magnetic member has a second surface facing and opposite to the first surface. The multiple outward pillar structures are installed on the second surfaces and the first surfaces.

14 Claims, 11 Drawing Sheets

(56) References Cited

U.S. PATENT DOCUMENTS

| | | | |
|---|---|---|---|
| 5,280,209 A | | 1/1994 | Leupold et al. |
| 5,349,258 A | | 9/1994 | Leupold et al. |
| 5,982,070 A | * | 11/1999 | Caamano ............... 310/216.047 |
| 6,713,921 B2 | * | 3/2004 | Sebastian et al. ........ 310/156.38 |
| 7,064,468 B2 | | 6/2006 | Fujinaka |
| 7,800,276 B2 | | 9/2010 | Purvines |
| 7,839,045 B2 | | 11/2010 | Wu et al. |
| 7,906,883 B2 | * | 3/2011 | Abe ......................... 310/156.64 |
| 7,973,443 B2 | * | 7/2011 | Nakamasu et al. ...... 310/156.62 |
| 8,278,794 B2 | * | 10/2012 | Ishikawa et al. ......... 310/156.35 |
| 8,536,751 B2 | * | 9/2013 | Cipriani ....................... 310/191 |
| 2004/0232796 A1 | * | 11/2004 | Weissensteiner ............. 310/216 |
| 2006/0012251 A1 | * | 1/2006 | Miyata et al. .................. 310/12 |
| 2006/0113849 A1 | * | 6/2006 | Enomoto et al. ................ 310/44 |
| 2006/0279158 A1 | | 12/2006 | Kim |
| 2008/0185927 A1 | * | 8/2008 | Ritchey ........................... 310/78 |
| 2008/0278022 A1 | * | 11/2008 | Burch et al. ............. 310/156.38 |
| 2009/0152956 A1 | * | 6/2009 | Yang ............................... 310/12 |

FOREIGN PATENT DOCUMENTS

| | | |
|---|---|---|
| TW | 345347 | 11/1998 |
| TW | M425453 U | 3/2012 |
| TW | M433018 U1 | 7/2012 |

OTHER PUBLICATIONS

Noguchi et al., Development of Dy-free NdFeB Anisotropic Bonded Magnet (New MAGFINE), 2011 1st International Electric Drives Production Conference (EDPC), Sep. 28-29, 2011, pp. 181-186.

Yoshihara et al., Development of Technology for Electrically Driven Powertrains in Hybrid Electric Vehicles, Hitachi Review, 2009, vol. 58(7), pp. 325-329.

Zeze et al., Improvement of Rotor Structure of Concentrated Surface Permanent Magnet Synchronous Motor, 2009 International Conference on Electrical Machines and Systems (ICEMS), Nov. 15-18, 2009.

Eguchi et al., Magnet Arrangement of Magnetic Flux Concentrating Type Surface Motors, 2009 International Conference on Electrical Machines and Systems (ICEMS), Nov. 15-18, 2009.

Yolacan et al., Magnet Shape Optimization of a Slotted Surface-Mounted Axial Gap PM Motor for Reducing Cogging Torque, 2010 XIX International Conference on Electrical Machines (ICEM), Sep. 6-8, 2010.

Huang et al., Optimization the Electromagnetic Torque Ripple of Permanent Magnet Synchronous Motor, 2010 International Conference on Electrical and Control Engineering (ICECE), Jun. 25-27, 2010, 3969-3972.

Intellectual Property Office, Ministry of Economic Affairs, R.O.C., "Office Action", Jun. 5, 2014, Taiwan.

* cited by examiner

ELECTRICAL ROTOR AND STATOR STRUCTURE

CROSS-REFERENCE TO RELATED APPLICATIONS

This non-provisional application claims priority under 35 U.S.C. §119(a) on Patent Application No(s). 101138330 filed in Taiwan, R.O.C. on Oct. 17, 2012, the entire contents of which are hereby incorporated by reference.

TECHNICAL FIELD

The disclosure relates to an electrical rotor and stator structure, and more particularly to an electrical rotor and stator structure having outward pillar structures on the surfaces of the magnetic members.

BACKGROUND

In recent years, with the increasing cost of energy, the regulations on energy consumption have been increasingly stringent in every country. Taking energy conservation in the manufacture industry for example, motors are accounted for more than 70 percentages of the overall electricity consumption. Therefore, how to increase the energy efficiency of the motors has become an important issue. Among different motors, the brushless permanent magnet motor offers a simple design that is easy to maintain and has high efficiency. In particular, an axial flux motor (AFM) of the brushless permanent magnet motor is the one having a smaller length-diameter ratio and suitable for thinner design.

Magnet is one of key components of the brushless permanent magnet motor that determines the performance and speed thereof. Therefore, methods, that can improve magnets in increasing the energy product, better control of the lines of flux inside the motor and suppressing the flux leakage, can increase the energy efficiency of motors. Hence, the capability of the magnets is a crucial issue in the development of the motors.

Among various types of magnets, rare-earth (material) magnets generally are strong permanent magnets made from alloys of rare earth elements. Motors using rare-earth magnet have higher energy product and better torque density, thus to be widely used in the mechanical and electrical applications.

However, the cost of rare earth metals has surged almost threefold in recent years. Hence, price of the motors that use rare-earth magnet has risen. Rising price forces the industry to endeavor to design a motor that utilizes less rare-earth magnets and levels up the energy efficiency of the motors.

BRIEF DESCRIPTION OF THE DRAWINGS

The disclosure will become more fully understood from the detailed description given herein below by way of example with reference to the accompanying drawings, and thus does not limit the disclosure, wherein.

SUMMARY

The disclosure provides an electrical rotor and stator structure comprising at least one stator, at least one rotor and a plurality of outward pillar structures. The at least one stator comprises a plurality of first magnetic members. Each first magnetic member has a first surface. The at least one rotor is adapted to be pivotally rotated relative to the at least one stator. The at least one rotor comprises a plurality of second magnetic members wherein each second magnetic member has a second surface facing and opposite to the first surface. The plurality of outward pillar structures is installed on the second surfaces and the first surfaces.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1A:
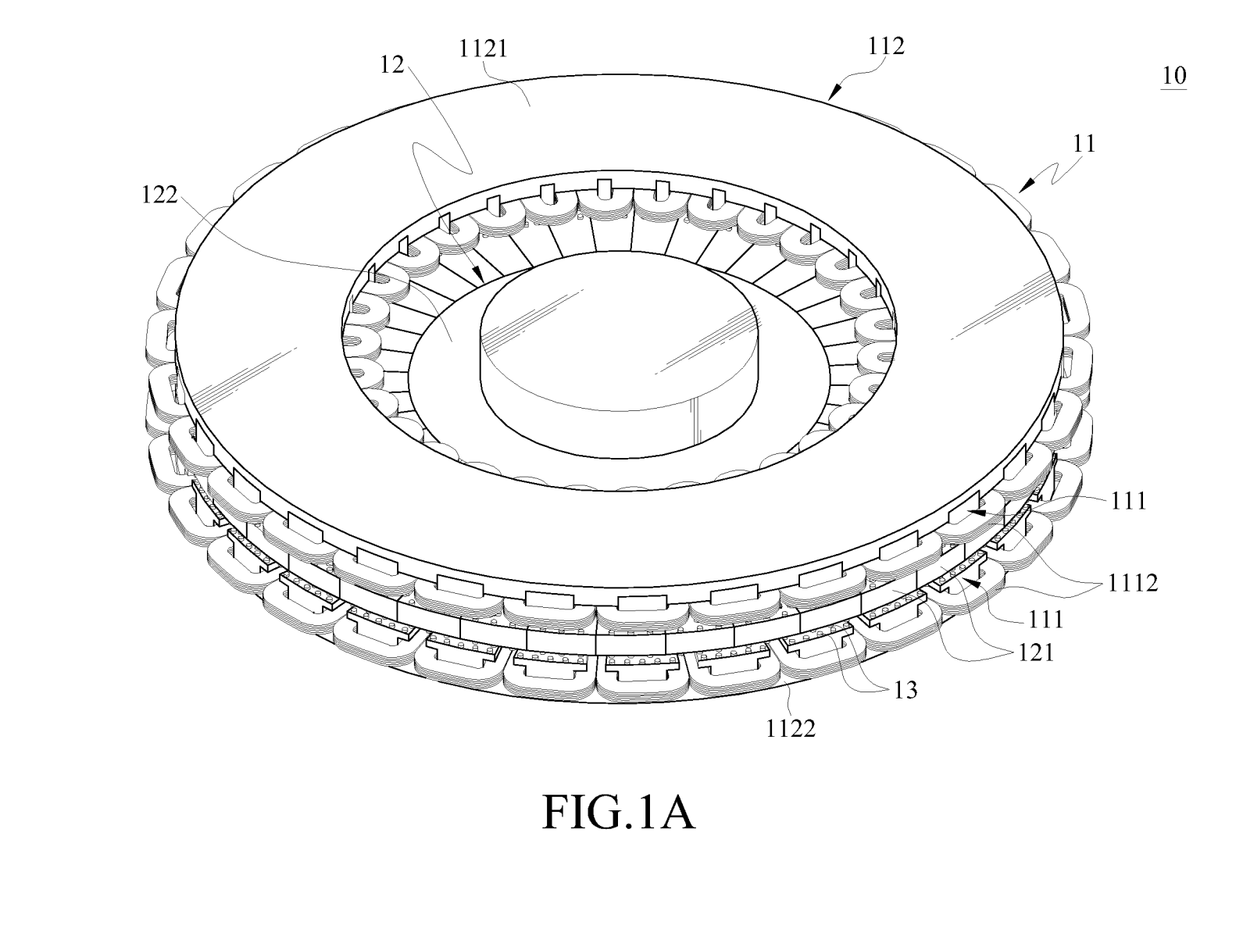
FIG. 1A is a perspective view of an electrical rotor and stator structure according to one embodiment of the disclosure.
Figure 1B:
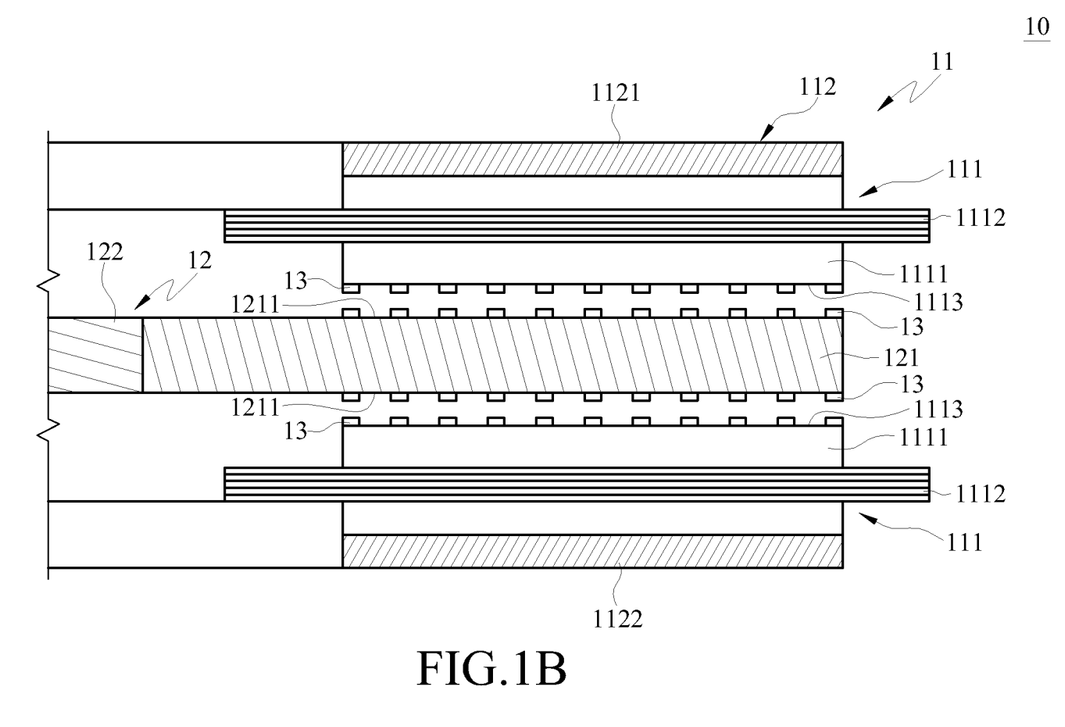
FIG. 1B is a partially sectional view of a motor with variable axial rotor and stator structure according to one embodiment of the disclosure.
Figure 2A:
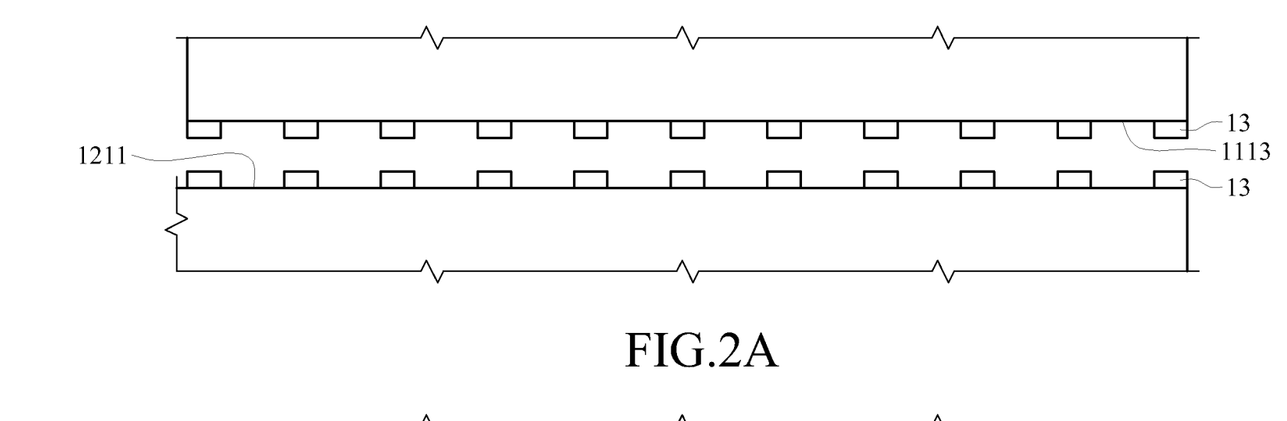
FIG. 2A is a partially enlarged sectional view of an electrical rotor and stator structure according to one embodiment of the disclosure.

Please refer to FIG. 1A, FIG. 1B and FIG. 2A, FIG. 1A is a perspective view of an electrical rotor and stator structure according to one embodiment of the disclosure. FIG. 1B is a partially sectional view of an electrical rotor and stator structure according to one embodiment of the disclosure. FIG. 2A is a partially enlarged sectional view of an electrical rotor and stator structure according to one embodiment of the disclosure.

An electrical rotor and stator structure 10 described in the disclosure comprises a stator 11, a rotor 12 and a plurality of outward pillar structures 13.

The stator 11 comprises a plurality of first magnetic members 111 and a shell body 112. The first magnetic members 111 are mounted on the shell body 112.

Specifically, in this embodiment, the shell body 112 comprises a first shell 1121 and a second shell 1122. A gap is arranged between a first shell 1121 and a second shell 1122. The first magnetic members 111 are mounted on the first shell 1121 and the second shell 1122. The first magnetic members 111 are located between the first shell 1121 and the second shell 1122. Each first magnetic member comprises a pole piece 1111 and a coil 1112. The coil 1112 is wound around the pole piece 1111. In other word, the first magnetic member 111 is an electromagnet. Moreover, the pole piece 1111 of each first magnetic member 111 has a first surface 1113.

In this embodiment, the material of the pole piece 1111 is soft magnetic composites. The pole piece 1111 may be formed by compressing a mixture of powered magnetic materials containing iron (Fe), silicon (Si), aluminum (Al) and manganese (Mo) into clumps through an insulating binder. The insulating binder may be made of an inorganic material, such as phosphates and oxides.

The rotor 12 is pivotally disposed on the stator 11 and may rotate relative to stator 11. The rotor 12 comprises a plurality of second magnetic members 121, which are permanent magnets. The rotor also comprises a rotating shaft 122, rotatable relatively to the shell body 112 as well as located between the first shell 1121 and the second shell 1122. The second magnetic members 121 are attached to the rotating shaft 122. The second magnetic members 121 are located between the first magnetic members 111 mounted on the first shell 1121, and the first magnetic members 111 are mounted on the second shell 1122. Both the second magnetic members 121 have two second surfaces 1211 opposite to each other. In each second magnetic member 121, one of the second surfaces 1211 faces to the first surface 1113 of the pole piece 1111 mounted on the first shell 1121, and the other second surfaces 1211 faces to the first surface 1113 of the pole piece 1111 mounted on the second shell 1122

In this embodiment, the second magnetic members 121 are resin-composition magnets, mainly comprising neodymium (Nd), iron (Fe), and boron (B) elements and produced by compression molding. In this embodiment, the second magnetic members 121 do not comprise dysprosium (Dy) element.

In this embodiment, the shell body 112 of the stator comprises two shells (the first shell 1121 and the second shell 1122), but the disclosure is not limited thereto. In other embodiments, the shell body 112 of the stator 11 may have a single shell, and the first magnetic member 111 exists in one side of the second magnetic member 121.

In this embodiment, the outward pillar structures 13 are installed on the first surfaces 1113 and the second surfaces 1211. The outward pillar structures may be disposed on the first surfaces 1113 or the second surfaces 1211 and be integrally formed into one piece. The outward pillar structures 13 may increase the magnetic flux density existing between the first surface 1113 of the first magnetic member 111 and the second surface 1211 of the second magnetic member 121. Thereby, the energy efficiency of the motor that utilizes the electrical rotor and stator structure 10 is increased.

In this embodiment, the outward pillar structures 13 on these first surfaces 1113 and the outward pillar structures 13 on the second surfaces 1211 are arranged opposite to each other (namely, opposite setting), as illustrated in FIG. 2A. Specifically, the opposite setting refers to that when the outward pillar structures 13 on the first surface 1113 is projected on the second surface 1211, the projected locations thereof are overlapped with the locations of the outward pillar structures 13 on the second surface 1211 completely.

Figure 2B:
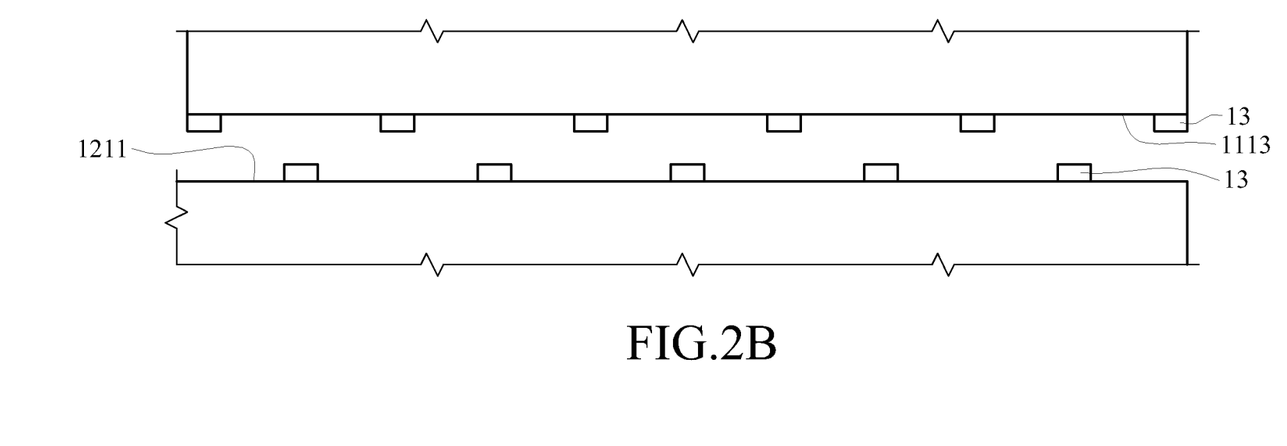
FIG. 2B is a partially enlarged sectional view of a motor with variable axial rotor and stator structure according to another embodiment of the disclosure.

In this embodiment, the relative setting of the outward pillar structures 13 on the first surface 1113 and the outward pillar structure 13 on the second surface 1211 is not intended to limit the disclosure. For example, in another embodiment as illustrated in FIG. 2B, the outward pillar structures 13 on the first surface 1113 and the outward pillar structure 13 on the second surface 1211 are arranged in a staggered setting (namely, an offset arrangement). The staggered setting refers to that when the outward pillar structures 13 on the first surface 1113 is projected on the second surface 1211, the projected locations thereof fall in between the locations of the outward pillar structures 13 on the second surface 1211, instead of overlapping with thereof. The staggered setting between the outward pillar structures 13 on the first surface 1113 and the outward pillar structures 13 on the second surface 1211 offer an advantage to the electrical rotor and stator structure 10 during assembly. Specifically, due to the staggered setting, the interference between the outward pillar structures 13 on the first surface 1113 and the outward pillar structures 13 on the second surface 1211 may be avoided.

Figure 3A:
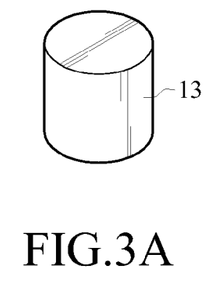
FIG. 3A is an enlarged view of an outward pillar structure according to one embodiment of the disclosure.
Figure 3B:
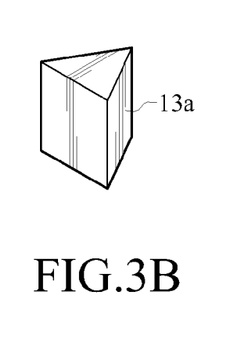
FIG. 3B to FIG. 3G are enlarged views of the outward pillar structure according to other embodiments of the disclosure.
Figure 3C:
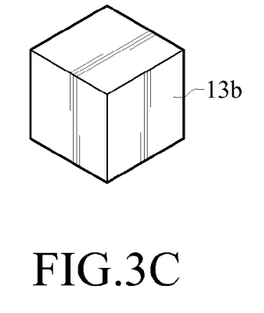
Figure 3D:
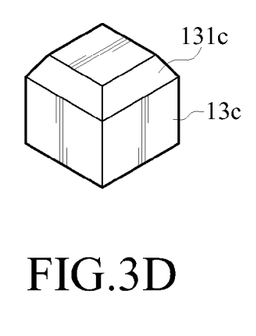
Figure 3E:
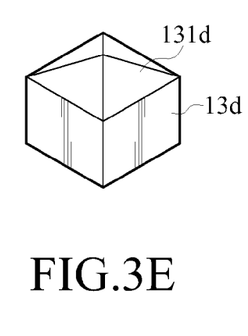
Figure 3F:
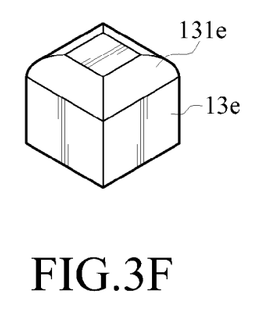
Figure 3G:
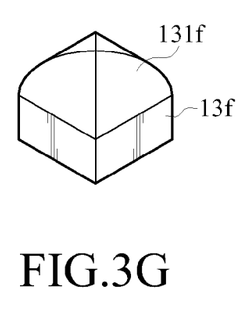
Figure 4A:
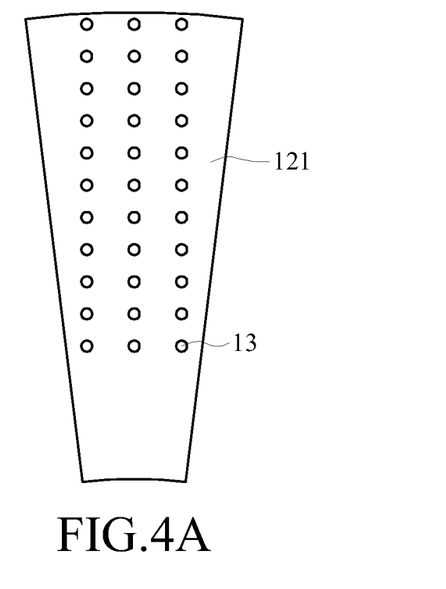
FIG. 4A is a partial schematic layout of the outward pillar structures according to one embodiment of the disclosure.
Figure 4B:
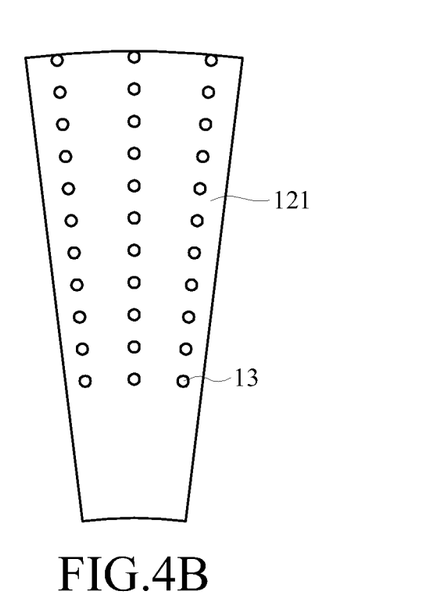
FIG. 4B is a partial schematic layout of the outward pillar structures according to another embodiment of the disclosure.

With reference to FIG. 3A, the outward pillar structure 13 may be of cylindrical shape, such as a circular cylinder, but the disclosure is not limited thereto. In other embodiments, the outward pillar structure 13a may be of a triangular prism (as shown in FIG. 3B) or the outward pillar structure 13b may be a square pillar with right angled edges (as illustrated in FIG. 3C). With reference to FIG. 3D to FIG. 3G, in other embodiments of the disclosure, one end of the outward pillar structure 13c/13d/13e/13f may be with chamfering and rounded edges 131c/131d/131e/131f respectively. Furthermore, in this embodiment, the setting of the outward pillar structures 13 is an array (as shown in FIG. 4A). In other embodiments, the setting of the outward pillar structures 13 is a radial layout (as illustrated in FIG. 4B, namely, arranged radially). However, the setting of the outward pillar structures 13 is not intended to limit the disclosure.

Figure 5A:
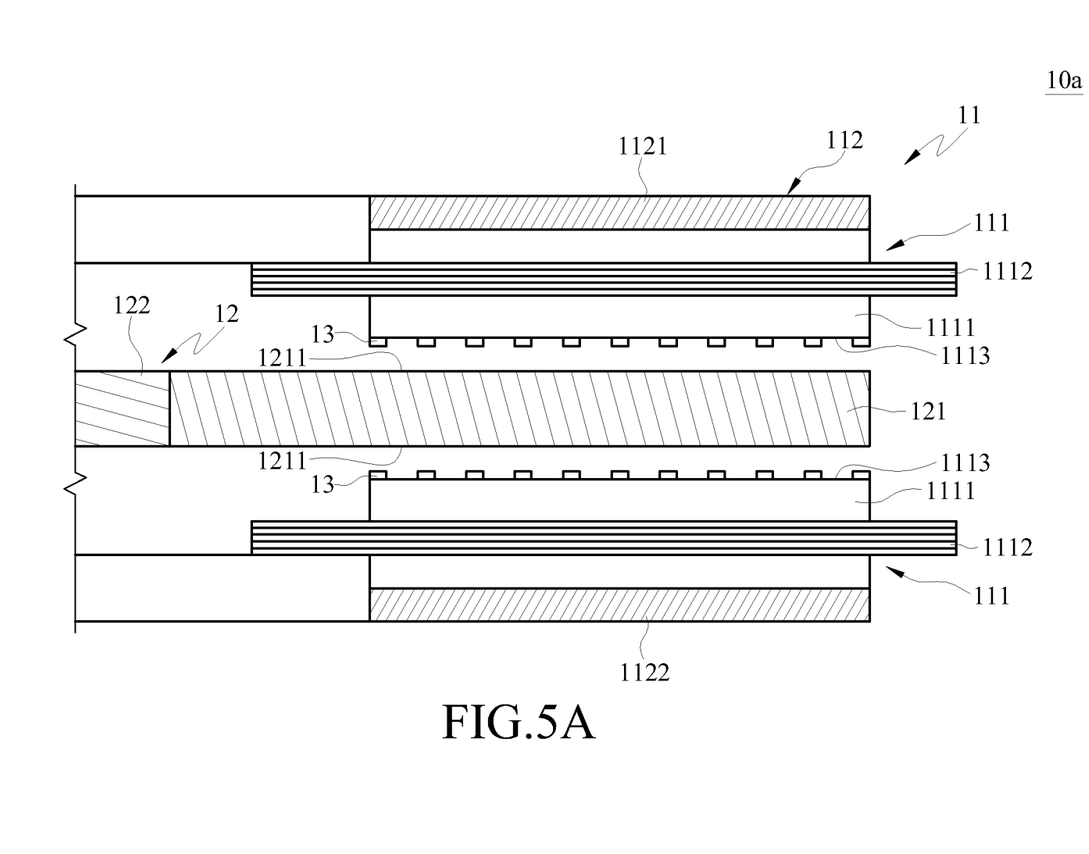
FIG. 5A is a partially sectional view of an electrical rotor and stator structure according to another embodiment of the disclosure.

With reference to FIG. 5A, FIG. 5A is a partially sectional view of an electrical rotor and stator structure according to another embodiment of the disclosure. This embodiment is similar to the embodiment of FIG. 1B, thus only the differences to be addressed.

The difference between the electrical rotor and stator structure 10a of this embodiment and that in the embodiment illustrated in FIG. 1B is that the outward pillar structures 13 are only disposed on the first surfaces 1113, but not the second surfaces 1211. However, such a setting of the outward pillar structures 13 still can increase the magnetic flux density between the first surfaces 1113 and the second surfaces 1211 of the electrical rotor and stator structure 10a. Thereby, the energy efficiency of the motor that utilizes the electrical rotor and stator structure 10a is increased.

Figure 5B:
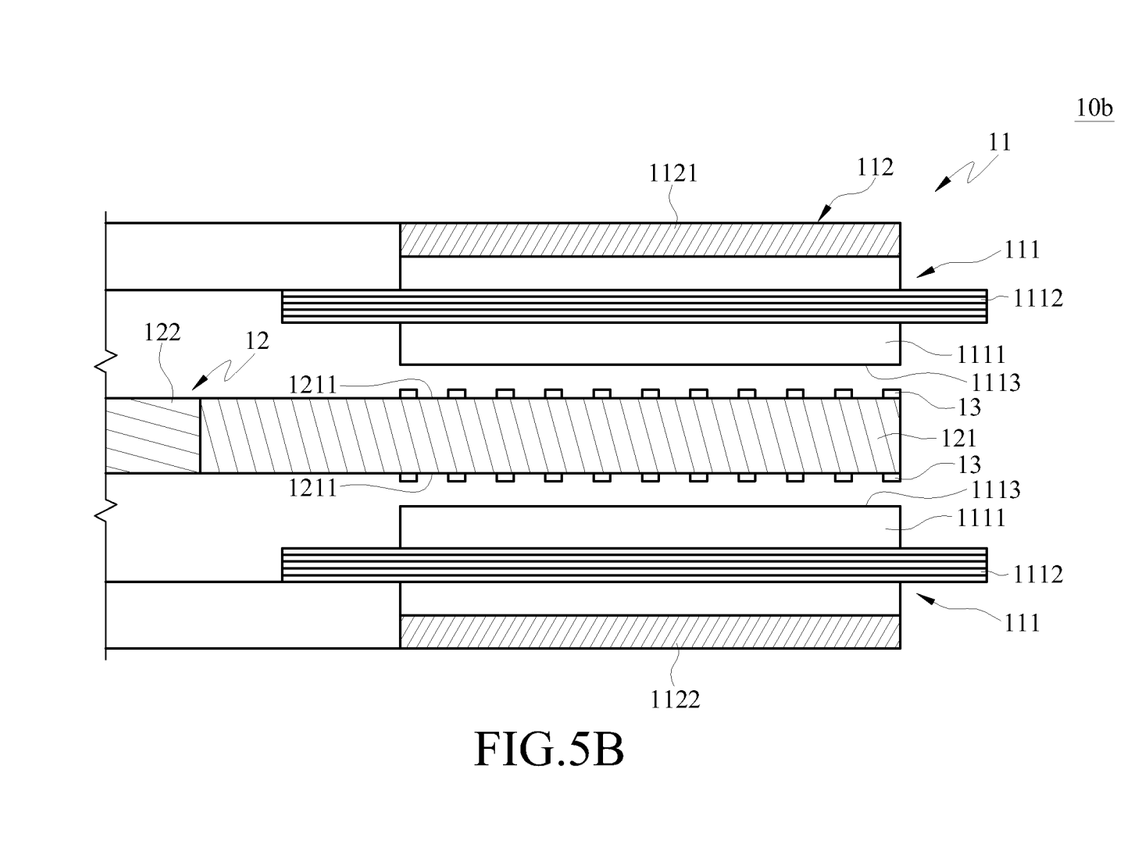
FIG. 5B is a partially sectional view of an electrical rotor and stator structure according to another embodiment of the disclosure.

With reference to FIG. 5B, FIG. 5B is a partially sectional view of an electrical rotor and stator structure according to another embodiment of the disclosure, which is similar to that of FIG. 1B, thus only the differences to be addressed.

The difference between the electrical rotor and stator structure 10b of this embodiment and that in the embodiment illustrated in FIG. 1B is that the outward pillar structures 13 are only disposed on the second surfaces 1211, but not the first surfaces 1113. However, such a setting of the outward pillar structures 13 still can increase the magnetic flux density between the first surfaces 1113 and the second surfaces 1211 of the electrical rotor and stator structure 10b. Thereby, the energy efficiency of the motor that utilizes the electrical rotor and stator structure 10b is increased.

Figure 6A:
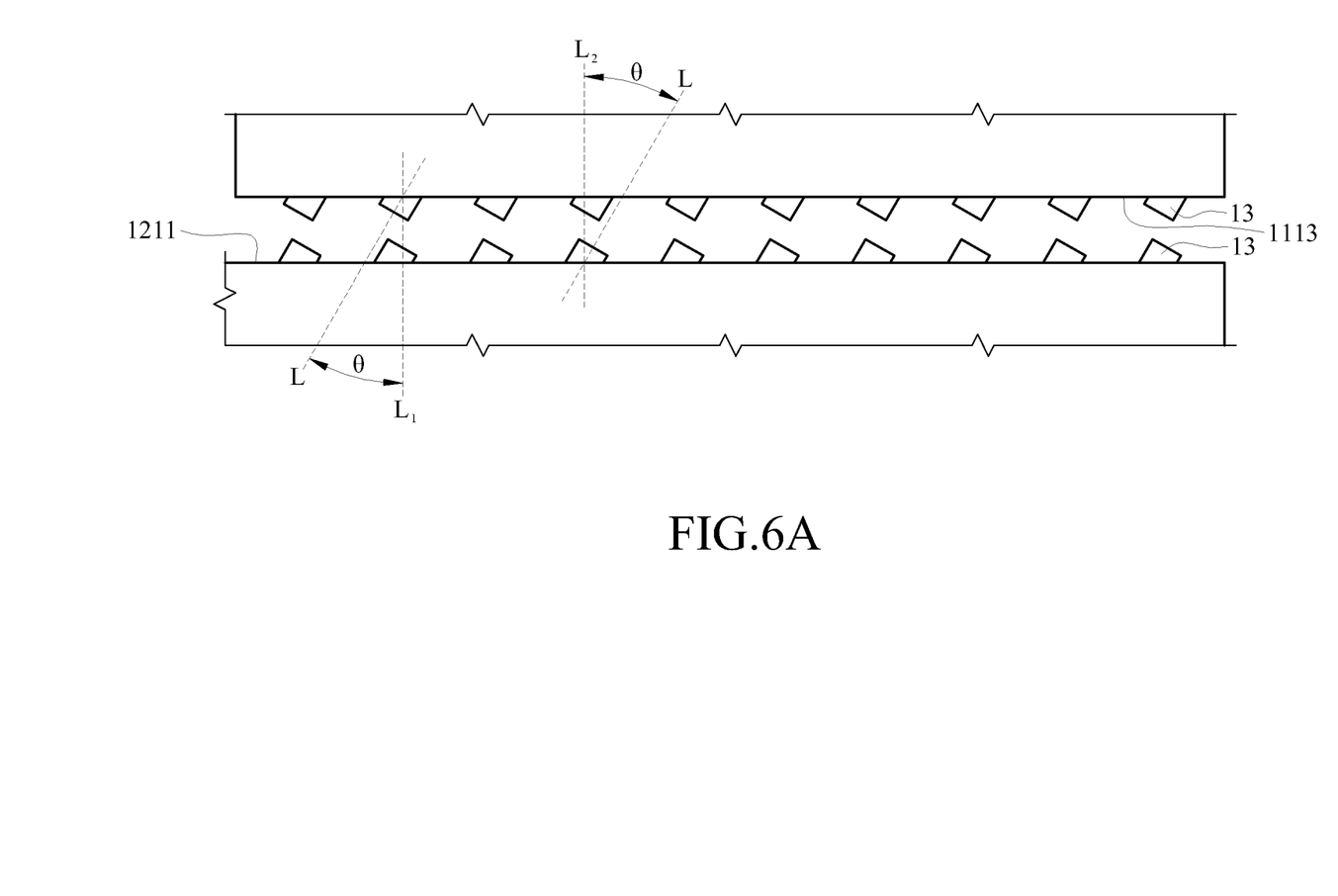
FIG. 6A is a partially enlarged sectional view of an electrical rotor and stator structure according to another embodiment of the disclosure.

With reference to FIG. 6A, FIG. 6A is a partially enlarged sectional view of an electrical rotor and stator structure according to another embodiment of the disclosure. This embodiment is similar to the embodiment of FIG. 2A, thus only the differences to be addressed.

Figure 6B:
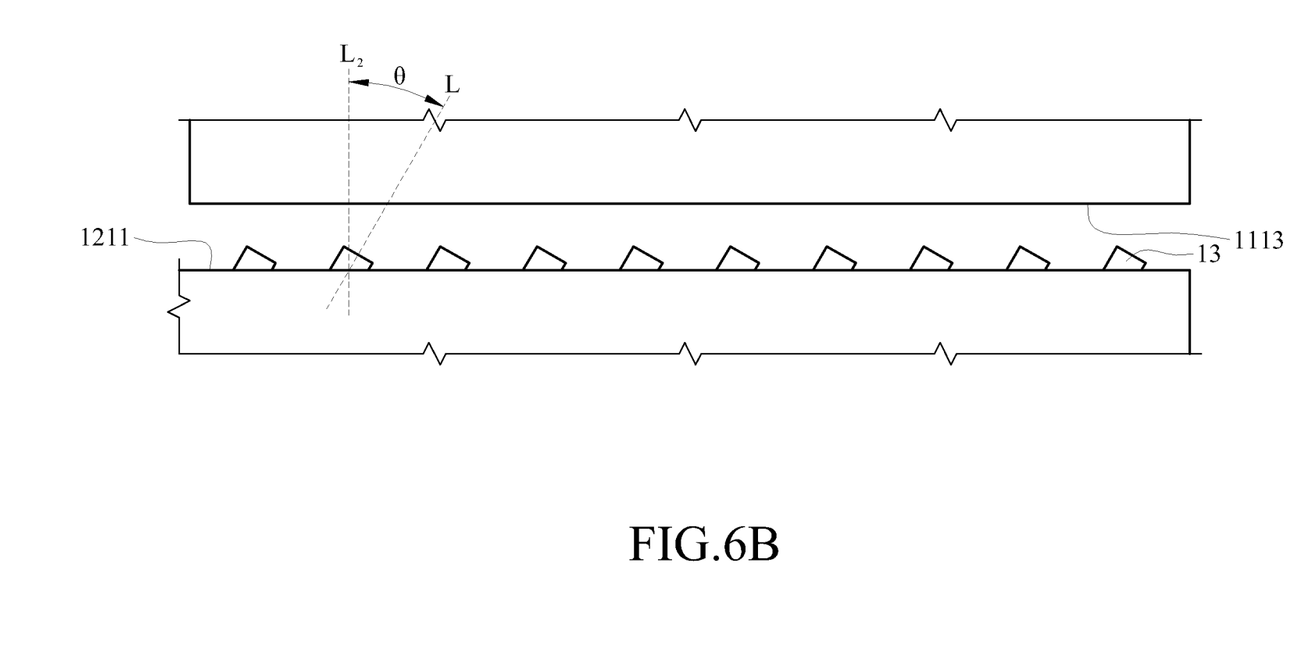
FIG. 6B is a partially enlarged sectional view of an electrical rotor and stator structure according to another embodiment of the disclosure.
Figure 6C:
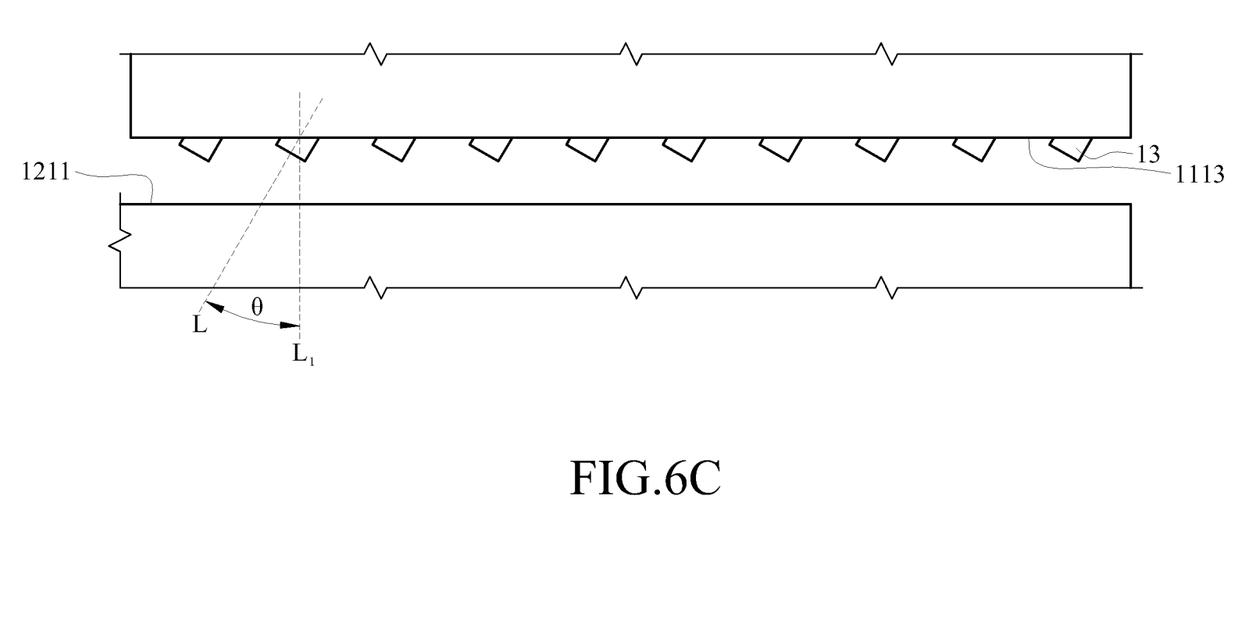
FIG. 6C is a partially enlarged sectional view of an electrical rotor and stator structure according to another embodiment of the disclosure.

The difference between the outward pillar structure 13 of this embodiment and that in the embodiment illustrated in FIG. 2A is that the outward pillar structure 13 inclines from the normal vector L1 of the first surface 1113 and the normal vector L2 of the second surface 1211 at an angle θ. The angle θ ranges between −45 to 45 degrees. Specifically, the structured centerline L of the outward pillar structure 13 to the normal vector L1 of the first surface 1113 and to the normal vector L2 of the second surface 1211 form an acute angle respectively. The inclined setting of the outward pillar structure 13 with respect to the normal vector L1 of the first surface 1113 or to the normal vector L2 of the second surface 1211 may increase the magnetic flux density. In this embodiment, the outward pillar structures 13 are mounted on the first surface 1113 and the second surface 1211 and incline thereof at an angle, but the disclosure is not limited thereto. For example, in another embodiment, only the outward pillar structures 13 on the second surfaces 1211 incline thereof at an angle, as illustrated in FIG. 6B. Moreover, in still another embodiment, only the outward pillar structures 13 on the first surfaces 1113 incline thereof at an angle, as illustrated in FIG. 6C.

According to various designs of the electrical rotor and stator structure of the embodiments described above, the Maxwell® simulation program is used to calculate the magnetic flux, maximum torque and magnetic flux at the Z axis of the electrical rotor and stator structure of each embodiment of the disclosure and those from prior art for comparison. The data is plotted in FIG. 7 and listed in Table 1 and Table 2.

Figure 7:
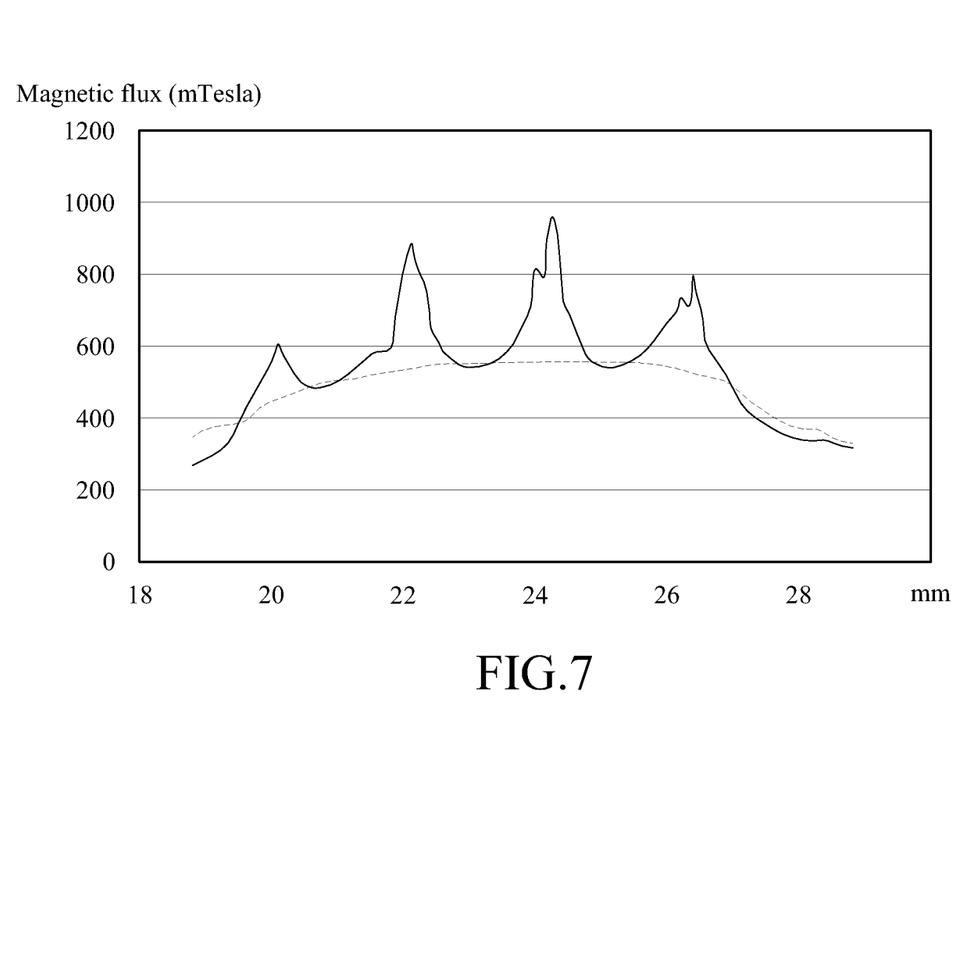
FIG. 7 is the result of the magnetic flux between the rotor and the stator, the radius length of the surface area, and with or without the pillar structure.

With reference to FIG. 7, the horizontal axis represents the length of the section of the first surface 1113 or the second surface 1211 (millimeter, mm), whereas the vertical axis represents the scale of the magnetic flux (milli-tesla, mTesla). The dashed line is the distribution of the magnetic flux of the electrical rotor and stator structures from prior art having the first surface 1113 and the second surface 1211 without the outward pillar structures 13. The solid line is the distribution of the magnetic flux of the electrical rotor and stator structures of the embodiments of the disclosure having the first surface 1113 and or second surface 1211 having the outward pillar structures 13. The outward pillar structures 13 are arranged in setting of a radial layout. Each outward pillar structure 13 is a circular cylinder with an outer diameter of 1.0 mm and 0.5 mm in height. Furthermore, the outward pillar structure 13 incline toward the first surface 1113 or the second surface 1211 at an angle of 30 degrees from the normal vector thereof. According to FIG. 7, the average magnetic flux exists in the electrical rotor and stator structure of the embodiment, whose first surfaces 1113 or second surfaces 1211 has the outward pillar structures 13, (solid line) is greater than that of the electrical rotor and stator structure without the outward pillar structures of prior art (dashed line). Therefore, the results produced by the simulation program prove that installation of the outward pillar structures 13 on the first surfaces 1113 of the first magnetic members 111 or on the second surfaces 1211 of the second magnetic members 121 may improve and increase the magnetic flux in the air gap located between the rotor and stator of the electrical rotor and stator structure. Thereby, the energy efficiency of the motor is increased.

A list of data of maximum torque, magnetic flux and magnetic flux in Z axis of different setting of the electrical rotor and stator structure is shown in Table 1. Data of the electrical rotor and stator structure without the outward pillar structures 13 of the prior art is regarded as a control group, The electrical rotor and stator structures of the embodiments 1 to 19 of the disclosure have the outward pillar structures 13 mounted on the second surfaces 1211 at various angles for different embodiments. In addition, the positive value of the angle means that the outward pillar structures 13 incline to the right of the normal vector L2 of the second surface 1211 and the negative value of the angle represents that the outward pillar structures 13 incline to the left of the normal vector L2 of the second surface 1211. Except the differences of the outward pillar structure and equivalent air gap, the rest of conditions are identical among the control group, and the embodiments 1 to 19 of the disclosure. The above-mentioned magnetic flux is defined as that from the first surface 1113 to the second surface 1211, whereas the magnetic flux in the Z axis represents the portion of magnetic flux from the first surface 1113 to the second surface 1211 in Z axis direction. The definition of the acronym mN-m is milli-newton meters, the unit of torque.

TABLE 1

| Group | Structural feature | Maximum torque (mN-m) | Magnetic flux (mTesla) | Magnetic flux in Z axis (mTesla) |
| --- | --- | --- | --- | --- |
| Control Group | No outward pillar structure | 316 | 460 | 418 |
| Embodiment 1 | Outward pillar structure at −45 degrees | 331 | 500 | 463 |
| Embodiment 2 | Outward pillar structure at −40 degrees | 335 | 502 | 465 |
| Embodiment 3 | Outward pillar structure at −35 degrees | 335 | 502 | 466 |
| Embodiment 4 | Outward pillar structure at −30 degrees | 332 | 499 | 463 |
| Embodiment 5 | Outward pillar structure at −25 degrees | 326 | 492 | 456 |
| Embodiment 6 | Outward pillar structure at −20 degrees | 335 | 497 | 461 |
| Embodiment 7 | Outward pillar structure at −15 degrees | 339 | 499 | 463 |
| Embodiment 8 | Outward pillar structure at −10 degrees | 336 | 495 | 459 |
| Embodiment 9 | Outward pillar structure at −5 degrees | 337 | 495 | 459 |

TABLE 1-continued

| Group | Structural feature | Maximum torque (mN-m) | Magnetic flux (mTesla) | Magnetic flux in Z axis (mTesla) |
|---|---|---|---|---|
| Embodiment 10 | Outward pillar structure at 0 degree | 340 | 496 | 460 |
| Embodiment 11 | Outward pillar structure at 5 degrees | 332 | 498 | 462 |
| Embodiment 12 | Outward pillar structure at 10 degrees | 337 | 496 | 460 |
| Embodiment 13 | Outward pillar structure at 15 degrees | 333 | 497 | 461 |
| Embodiment 14 | Outward pillar structure at 20 degrees | 336 | 498 | 462 |
| Embodiment 15 | Outward pillar structure at 25 degrees | 337 | 494 | 457 |
| Embodiment 16 | Outward pillar structure at 30 degrees | 338 | 496 | 460 |
| Embodiment 17 | Outward pillar structure at 35 degrees | 334 | 502 | 465 |
| Embodiment 18 | Outward pillar structure at 40 degrees | 336 | 500 | 463 |
| Embodiment 19 | Outward pillar structure at 45 degrees | 338 | 501 | 463 |

Based on the data in Table 1, the maximum torque, the magnetic flux and the magnetic flux in Z axis of the outward pillar structures 13 of each embodiment are greater than those of the electrical rotor and stator structure of the control group that has no outward pillar structure. Among all, the embodiment has the outward pillar structure 13 at 0 degree(s) producing the upmost maximum torque; at −40, −35, and 35 degrees the highest magnetic flux; and at −35 degrees the highest magnetic flux in Z axis.

Table 2 contains a list of data of maximum torque, magnetic flux and magnetic flux in Z axis of different settings of the electrical rotor and stator structure. Data of the electrical rotor and stator structure without the outward pillar structures 13 of the prior art is regarded as a control group. The electrical rotor and stator structures of the embodiments 1 to 19 of the disclosure have the outward pillar structures 13 mounted on both the first surface 1113 and the second surfaces 1211 at various angles for different embodiments. The positive value of the angle means that the outward pillar structures 13 incline to the right of the normal vector L1 of the first surface 1113 and the outward pillar structures 13 incline to the right of the normal vector L2 of the second surface 1211. The negative value of the angle represents that the outward pillar structures 13 incline to the left of the normal vector L1 of the first surface 1113 and to the left of the normal vector L2 of the second surface 1211. Except the differences of the outward pillar structure and equivalent air gap, the rest of conditions are identical among the control group, and the embodiments 1 to 19 of the disclosure. The magnetic flux is defined as that from the first surface 1113 to the second surface 1211, whereas the magnetic flux in the Z axis represents the portion of magnetic flux from the first surface 1113 to the second surface 1211 in Z axis direction.

TABLE 2

| Group | Structural feature | Maximum torque (mN-m) | Magnetic flux (mTesla) | Magnetic flux in Z axis (mTesla) |
|---|---|---|---|---|
| Control Group | No outward pillar structure | 347 | 499 | 456 |
| Embodiment 1 | Outward pillar structure at −45 degrees | 376 | 595 | 553 |
| Embodiment 2 | Outward pillar structure at −40 degrees | 372 | 592 | 550 |
| Embodiment 3 | Outward pillar structure at −35 degrees | 376 | 586 | 544 |
| Embodiment 4 | Outward pillar structure at −30 degrees | 367 | 581 | 539 |
| Embodiment 5 | Outward pillar structure at −25 degree | 381 | 588 | 547 |
| Embodiment 6 | Outward pillar structure at −20 degrees | 384 | 587 | 546 |
| Embodiment 7 | Outward pillar structure at −15 degrees | 374 | 585 | 544 |
| Embodiment 8 | Outward pillar structure at −10 degrees | 374 | 576 | 535 |
| Embodiment 9 | Outward pillar structure at −5 degrees | 378 | 579 | 538 |
| Embodiment 10 | Outward pillar structure at 0 degree | 369 | 580 | 539 |
| Embodiment 11 | Outward pillar structure at 5 degrees | 372 | 581 | 540 |

TABLE 2-continued

| Group | Structural feature | Maximum torque (mN-m) | Magnetic flux (mTesla) | Magnetic flux in Z axis (mTesla) |
|---|---|---|---|---|
| Embodiment 12 | Outward pillar structure at 10 degrees | 373 | 583 | 542 |
| Embodiment 13 | Outward pillar structure at 15 degrees | 359 | 578 | 537 |
| Embodiment 14 | Outward pillar structure at 20 degrees | 362 | 586 | 545 |
| Embodiment 15 | Outward pillar structure at 25 degrees | 365 | 588 | 547 |
| Embodiment 16 | Outward pillar structure at 30 degree | 376 | 589 | 548 |
| Embodiment 17 | Outward pillar structure at 35 degrees | 371 | 587 | 545 |
| Embodiment 18 | Outward pillar structure at 40 degrees | 373 | 590 | 548 |
| Embodiment 19 | Outward pillar structure at 45 degrees | 376 | 589 | 546 |

Based on the data in Table 2, the maximum torque, the magnetic flux and the magnetic flux in Z axis of each embodiment having the outward pillar structures 13 are greater than those of the electrical rotor and stator structure of the control group having no outward pillar structure. Among all, the embodiment has the outward pillar structure 13 at −20 degrees producing the upmost maximum torque; and at −45 degrees the highest magnetic flux and the highest magnetic flux in Z axis.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electrical rotor and stator structure, comprising:
   at least one stator, comprising a shell body and a plurality of first magnetic member pairs, wherein the shell body comprising a first shell and a second shell with a gap arranged in between, wherein one first magnetic member of the first magnetic member pairs is mounted on the first shell, the other first magnetic member of the first magnetic member pairs is mounted on the second shell, each of the first magnetic members has a first surface;
   at least one rotor, adapted to be pivotally rotated relative to the at least one stator, lies in parallel plane with the at least one stator and in between the first shell and the second shell of the at least one stator, wherein the at least one rotor comprising a plurality of second magnetic members, mounted laterally connecting to each other, wherein each second magnetic member has a second surface facing the first surface; and
   a plurality of rows of outward pillar structures, wherein at least three rows of outward pillar structures are installed on each of the second surfaces or each of the first surfaces, and each row of the outward pillar structures comprises at least three outward pillar structures.

2. The electrical rotor and stator structure according to claim 1, wherein at least two rows of outward pillar structures are installed on each of the second surfaces and each of the first surfaces.

3. The electrical rotor and stator structure according to claim 2, wherein the outward pillar structures on the first surfaces and the outward pillar structures on the second surfaces are arranged opposite to each other.

4. The electrical rotor and stator structure according to claim 2, wherein the outward pillar structures on the first surfaces and the outward pillar structures on the second surfaces are arranged in a staggered setting.

5. The electrical rotor and stator structure according to claim 1, wherein the outward pillar structures incline from the normal vector of the first surface or the normal vector of the second surface at an angle.

6. The electrical rotor and stator structure according to claim 1, wherein the outward pillar structures are of cylindrical shape.

7. The electrical rotor and stator structure according to claim 6, wherein shapes of the outward pillar structures are circular cylinders, triangular prisms, or square pillars.

8. The electrical rotor and stator structure according to claim 7, wherein edges of the outward pillar are right angled, chamfered, or rounded.

9. The electrical rotor and stator structure according to claim 1, wherein setting of the outward pillar structures is an array.

10. The electrical rotor and stator structure according to claim 1, wherein setting of the outward pillar structures is a radial layout.

11. The electrical rotor and stator structure according to claim 1, wherein each first magnetic member comprises a pole piece and a coil, and the coil is wound around the pole piece.

12. The electrical rotor and stator structure according to claim 1, wherein each second magnetic member is a permanent magnet.

13. The electrical rotor and stator structure according to claim 1, wherein the at least one rotor comprises a rotating shaft, the rotating shaft is adapted to rotate relative to the shell body, and the second magnetic members are mounted on the rotating shaft.

14. The electrical rotor and stator structure according to claim 13, wherein the rotating shaft is located between the first shell and the second shell, and the second magnetic members are located between the first magnet members on the first shell and the first magnet members on the second shell.

* * * * *